(12) United States Patent
AbuSamra et al.

(10) Patent No.: US 7,318,513 B2
(45) Date of Patent: Jan. 15, 2008

(54) MULTI-FUNCTION CENTRIFUGAL CLUTCH (75) Inventors: Muneer AbuSamra, Southern Pines, NC (US); Ludger Ronge, Eriskirch (DE); Charles E. Allen, Jr., Rochester Hills, MI (US); Winfried Sturmer, Euerbach (DE); Karl-Fritz Heinzelmann, Meckenbeuren (DE); Loren Christopher Dreier, Vass, NC (US); Robert Anthony Sayman, Laurinburg, NC (US); James Henry DeVore, Laurinburg, NC (US); Ronald Peter Muetzel, Friedrichshafen (DE)

(73) Assignee: Meritor Transmission Corporation, Troy, MI (US)

( * ) Notice: Subject to any disclaimer, the term of this patent is extended or adjusted under 35 U.S.C. 154(b) by 213 days.

(21) Appl. No.: 11/058,877

(22) Filed: Feb. 16, 2005

(65) Prior Publication Data

US 2006/0180425 A1   Aug. 17, 2006

(51) Int. Cl.
*F16D 43/08* (2006.01)

(52) U.S. Cl. ............ 192/103 A; 192/3.63; 192/104 R; 192/105 B (58) Field of Classification Search ................ None
See application file for complete search history.

(56) References Cited

U.S. PATENT DOCUMENTS

| 1,995,406 | A | 3/1935 | Tower |
| 2,071,588 | A | 2/1937 | Swennes et al. |
| 2,979,171 | A | 4/1961 | Bland et al. |
| 3,580,372 | A | 5/1971 | Schiefer et al. |
| 4,081,065 | A | 3/1978 | Smyth et al. |
| 4,111,291 | A | 9/1978 | Horstman |
| 4,589,296 | A * | 5/1986 | Sato et al. .................... 74/411 |
| 5,638,935 | A * | 6/1997 | Fehring ................. 192/105 B |
| 5,681,242 | A | 10/1997 | Bates |
| 6,358,186 | B1 | 3/2002 | Kosik et al. |
| 6,502,476 | B2 | 1/2003 | Genise |
| 7,063,199 | B2 * | 6/2006 | Weidinger et al. ...... 192/105 B |
| 2002/0072447 | A1 | 6/2002 | Genise |
| 2002/0134642 | A1 | 9/2002 | Genise |
| 2002/0137595 | A1 | 9/2002 | Markyvech et al. |
| 2002/0137596 | A1 | 9/2002 | Markyvech |
| 2002/0137597 | A1 | 9/2002 | Genise et al. |
| 2003/0042108 | A1 | 3/2003 | Gochenour et al. |
| 2003/0045987 | A1 | 3/2003 | Gochenour |

FOREIGN PATENT DOCUMENTS

| DE | 831 507 | 2/1952 |
| DE | 896 304 | 1/1954 |
| DE | 906 176 | 3/1954 |
| DE | 11 04 356 | 4/1961 |
| DE | 27 43 400 | 3/1979 |
| DE | 30 45 840 | 6/1986 |

* cited by examiner

*Primary Examiner*—Rodney H. Bonck
(74) *Attorney, Agent, or Firm*—Carlson, Gaskey & Olds (57) ABSTRACT A clutch assembly includes a reaction surface that provides several disengagement surfaces that cause axial movement of a front plate to reduce torque transmission at rotational speeds above an engagement speed. The disengagement surfaces reduce torque to break torque lock at rotational speeds corresponding to desired gear changes. The clutch assembly is controlled to tailor the relationship between clutch torque and engine speed to current vehicle operating conditions to provide consistent vehicle performance over different operating conditions.

10 Claims, 6 Drawing Sheets

MULTI-FUNCTION CENTRIFUGAL CLUTCH

BACKGROUND OF THE INVENTION

This invention relates to a centrifugal clutch assembly, and specifically to a centrifugal clutch assembly that is controllable for tailoring clutch torque to current vehicle operating conditions.

Typically, an automatic clutch assembly includes a plurality of centrifugal weights that move radially outward in response to rotation. Radial movement of the centrifugal weights is translated into axial movement of a corresponding reaction surface. Radial movement of the centrifugal weights corresponds with rotational speed of the clutch assembly to begin clutch actuation. Typically, clutch actuation begins within a substantially narrow and fixed range of rotational speed.

Once the centrifugal clutch is engaged, the only way to disengage the clutch is to decrease rotational speed. The rotational speed of the clutch assembly corresponds to actuation of an accelerator pedal. As the accelerator pedal is actuated, the clutch begins to engage and transfer torque. Torque transfer increases with rotational speed according to a fixed relationship. This relationship holds regardless of current vehicle conditions. The fixed relationship causes different vehicle start off characteristics for different vehicle conditions. An unloaded vehicle may start off too quickly, whereas a fully loaded vehicle may start off sluggishly.

Transmission shifting requires torque transmission to be momentarily interrupted to release torque lock between gears. Conventional centrifugal clutch assemblies often include an auxiliary clutch to release torque lock and facilitate gear changes. Additional clutch mechanisms complicate manufacture and operation, and can reduce dependability and durability.

Accordingly, it is desirable to develop a centrifugal clutch assembly that is adaptable to differing vehicle operating conditions and can accommodate transmission gear changes to provide consistent vehicle performance.

SUMMARY OF THE INVENTION

The present invention is a centrifugal clutch assembly with a centrifugal weight reaction surface that provides a non-linear relationship between torque transfer and rotational speed. The present invention also provides a method of controlling clutch torque transfer to respond to various vehicle operating conditions.

The centrifugal clutch assembly of this invention includes a reaction surface that provides several disengagement surfaces that cause axial movement of a front plate to reduce torque transmission at rotational speeds above an engagement speed. Radial outward movement of centrifugal weights initially causes engagement, and then provides for disengagement to break torque lock at rotational speeds greater than engagement speeds. Further, as rotational speed continues to increase the centrifugal weights move further radially outward to cause reengagement of the centrifugal clutch assembly to transmit torque.

This invention further includes a method of adapting clutch torque to vehicle operating conditions such that the relationship between accelerator pedal travel and vehicle acceleration is consistent regardless of current vehicle operating conditions. The method of this invention tailors clutch actuation to the current vehicle operating conditions such that a lightly loaded and heavily loaded vehicle will both start off at substantially the same acceleration. As the engine speed and torque transfer increase, movement of the accelerator pedal is synchronized with vehicle acceleration to provide the clutch torque required to achieve the desired vehicle acceleration for the current vehicle operating conditions. Accordingly, the centrifugal clutch assembly of this invention is adaptable to differing vehicle operating conditions to provide consistent vehicle performance.

The various features and advantages of this invention will become apparent to those skilled in the art from the following detailed description of the currently preferred embodiment and drawings that accompany the detailed description that are briefly described as follows.

DETAILED DESCRIPTION OF THE PREFERRED EMBODIMENT

Figure 1:
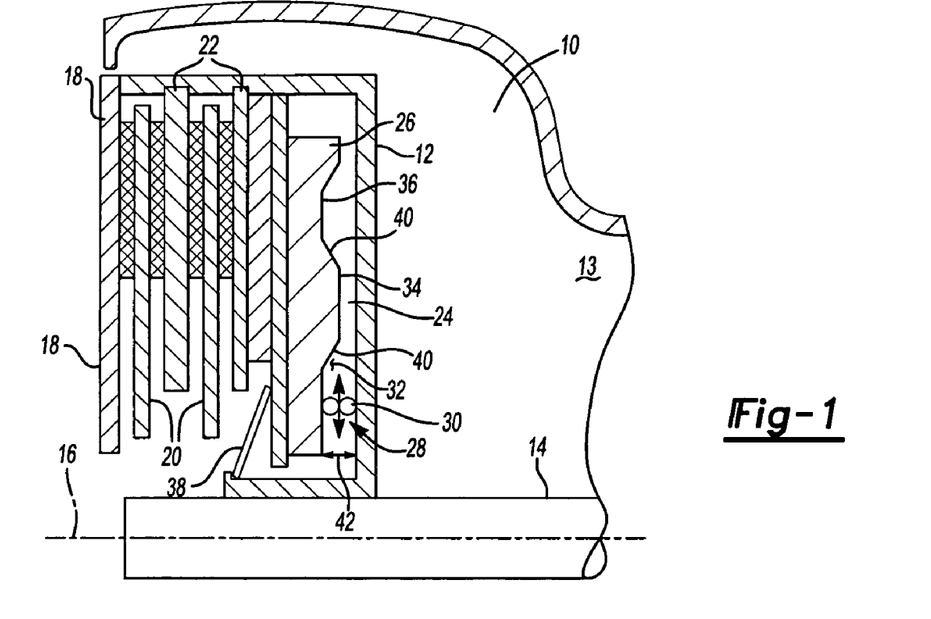
FIG. 1 is a schematic view of a centrifugal clutch assembly according to this invention.

Referring to FIG. 1, a centrifugal clutch assembly 10 is schematically shown and includes a clutch cover 12 mounted to a flywheel 18. The flywheel 18 and clutch cover 12 rotate about an axis 16 and transmit torque to an output shaft 14. The clutch assembly 10 includes at least one friction disk 20 rotatable to drive the output shaft 14. Pressure plates 22 are movable axially to clamp the friction disks 20. The pressure plates 22 move axially in response to movement of a front plate 26. A plurality of centrifugal weights 28 (only one shown for clarity) each include rollers 30 that move within a space 24 defined between the front plate 26 and the clutch cover 12. The specific configuration shown is but one example of an automated clutch, a worker skilled in the art would understand that other automated clutch configurations would also benefit from application of this invention.

The front plate 26 includes a reaction surface 32 that includes engagement portions 34 and disengagement portions 36. The reaction surface 32 operates in concert with the centrifugal weights 28 to compress a compression spring 38 and cause engagement between the pressure plates 22 and the friction disks 20. The engagement between friction disks 20 and the pressure plates 22 provides for the transfer of torque from the flywheel 18 to the output shaft 14.

The reaction surface 32 includes ramped surfaces 40 between each of the disengagement and engagement surfaces 36, 34. Maximum torque is transferred through the clutch assembly 10 with the centrifugal weights 28 disposed on one of the engagement surfaces 34. A reduced amount, or no torque, is transferred when the centrifugal weights 28 are moved onto one of the disengagement surfaces 36. Torque is proportionally transferred along the ramped surface 40 beginning with zero torque transferred at the disengagement surface 36, and the maximum torque transferred at each of the engagement surfaces 34.

The reaction surface 32 of this invention includes several of the ramped surfaces 40 such that as rotational speed increases and the centrifugal weights 28 move radially outward, torque transfer changes between full engagement, transferring the maximum amount of torque, and disengagement where only a portion of the maximum torque is transmitted to the output shaft 14.

The clutch assembly 10 shown in FIG. 1 includes two (2) engagement surfaces 34 and two (2) disengagement surfaces 36. A worker with the benefit of this disclosure will understand that different numbers of engagement and disengagement surfaces 34 are within the contemplation of this invention to provide desired torque transfer relative to a specified range of rotational speeds.

A distance 42 between the reaction surface 32 and the clutch cover 12 corresponds with a desired axial movement of the front plate 26. Axial movement of the front plate 26 compresses the compression spring 38 and causes engagement between the pressure plates 22 and friction disks 20.

During operation, the centrifugal weights 28 move radially outward in response to rotational speed. During normal operation of the clutch assembly 10, switching gear combinations changes the gear ratio within a transmission 13. Gear shifting coincides with a predetermined rotational speed of the clutch assembly 10. Shifting gears within the transmission 13 requires torque to be momentarily interrupted to release torque lock between gears. The clutch assembly 10 of this invention includes the reaction surface 32 that provides several disengagement surfaces 36 that cause axial movement of the front plate 26 to reduce torque transmission at rotational speeds above the engagement speed. The disengagement surfaces 36 reduce torque to break torque lock at rotational speeds corresponding to desired gear changes. Radial outward movement of the centrifugal weights 28 moves the front plate 26 initially into engagement, then back toward a disengaged position for a first gear change. An increased rotational speed from the first gear change moves the centrifugal weights 28 radially outward further to reengage and transmit torque.

The magnitude of axial movement of the front plate 26 is determined to provide the desired amount of torque transfer at a given rotational speed. The grade of the ramped surfaces 40 controls how quickly torque is transitioned from a disengaged condition to a fully engaged condition.

The length of each portion of the reaction surface 32 is tailored to the amount of torque transfer desired at a given rotational speed. Initially, the reaction surface 32 is disposed such that little or no torque is transmitted. Radial movement of the centrifugal weights 28 up the ramped surfaces 40 begins torque transfer. Increased rotational speed provides increased torque transfer, until reaching a rotational speed corresponding with a desired gear change. At the rotational speed corresponding with the desired gear change, the centrifugal weights 28 move toward a disengagement surface 36. The movement toward the disengagement surface 36 provides the required torque reduction that breaks torque lock and allows shifting of gears. Once the gear change is completed, rotational speed continues to increase causing further radial movement of the centrifugal weights 28 and thereby movement of the front plate 26 axially toward an engaged position.

Figure 2:
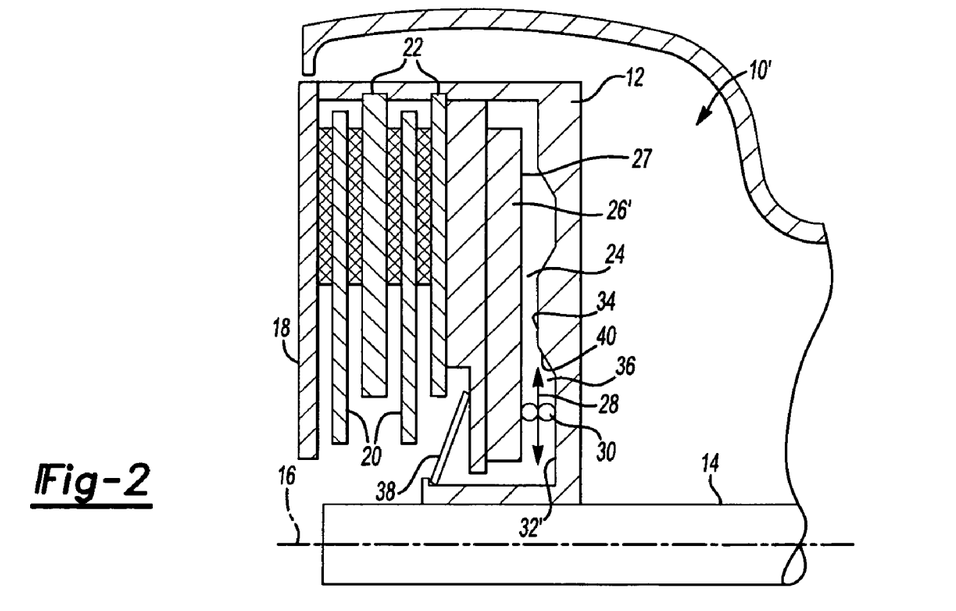
FIG. 2 is schematic view of another centrifugal clutch assembly according to this invention.

Referring to FIG. 2, another clutch assembly 10' according to this invention includes a reaction surface 32' disposed on an inner surface of the clutch cover 12. A front plate 26' includes a generally flat surface 27. The reaction surface 32' can be of any configuration required to provide the desired changes in torque transfer at desired rotational speeds. The distance between the clutch cover reaction surface 32' and the front plate 26' at any radial position is such that a desired pressure is applied between the pressure plates 22 and the friction disks 20. Because radial movement of the centrifugal weights 28 is substantially fixed relative to rotational speed, the reaction surface 32' is tailored to provide the desired amount of pressure between friction plates 20 and pressure plates 22 and thereby the desired amount of torque transfer at the desired rotational speed corresponding to a desired gear change.

Figure 3:
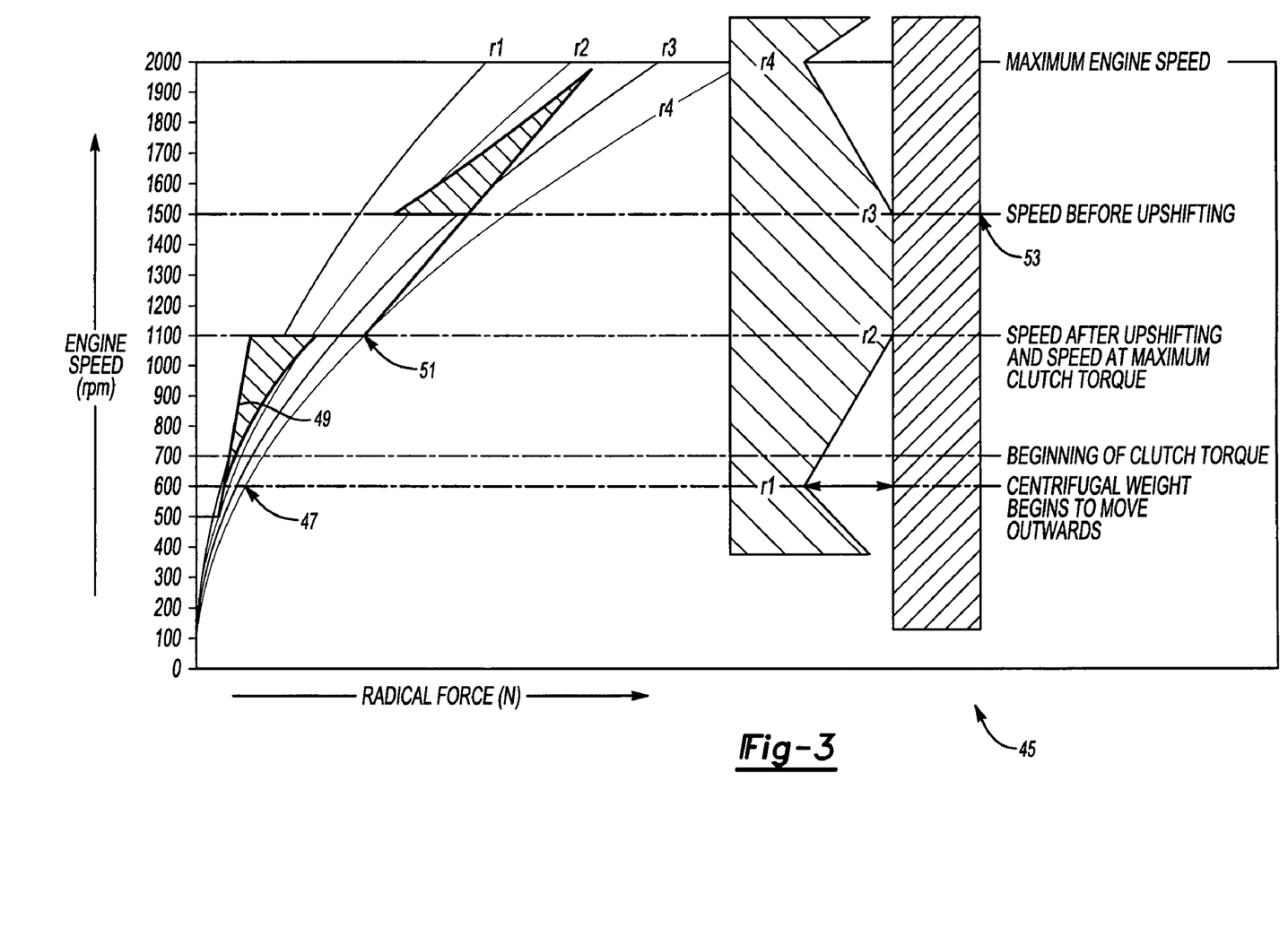
FIG. 3 is a graph illustrating the relationship between radial force and engine speed for a clutch assembly according to this invention.

Referring to FIG. 3, a graph 45 illustrates the relationship between engine speed and radial force exerted by the centrifugal weights 28. Beginning at an engine speed near idle speed as indicated at 47, the centrifugal weights 28 begin moving outwardly. Outward movement results in an increase in force on the pressure plates 22 as indicated by line 49. The force increases with the engine speed to a maximum clutch torque indicated at 51. The maximum clutch torque indicated at 51 is maintained until an engine speed is reacted at which an up-shift is required, as indicated at 53. The force exerted by the centrifugal weights 28 to provide for the up-shift is reduced to provide for the desired shift. The force exerted by the centrifugal weights 28 provides for the desired smooth shift between gears. As appreciated, the graph 45 illustrates an example profile, the specific profile would be tailored to the application specific requirements of clutch torque and engine speed. An increase in engine speed toward a maximum engine speed results in an increased force exerted on the pressure plates 22 up to the maximum amount of force.

Figure 4:
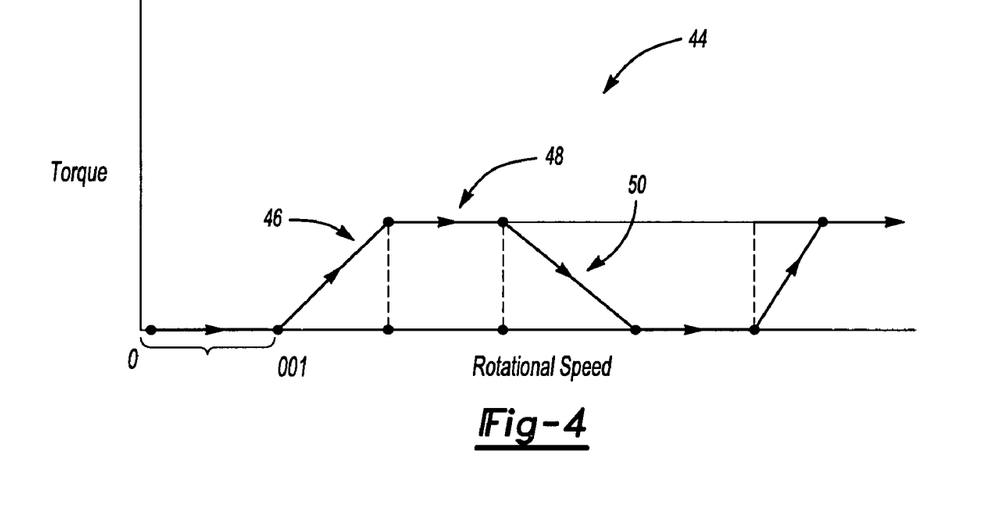
FIG. 4 is a graph illustrating the relationship between torque transfer and rotational speed for a clutch assembly according to this invention.

Referring to FIG. 4, graph 44 illustrates a relationship between torque transfer to the output shaft 14 and rotational speed of the clutch assembly 10. The relationship illustrated includes an initial ramped portion 46 from idle to full torque transfer. The full torque transfer, indicated at 48, is maintained for a desired time until a reduction in torque that is shown as a downward ramped portion 50. The increase in rotational speed reengages full torque transfer through the clutch assembly 10. It should be understood that a worker with the benefit of this disclosure would understand how to configure the reaction surface 32 to accomplish desired application specific changes in torque.

This invention provides a method of tailoring clutch torque to vehicle conditions. Adjusting clutch torque to vehicle conditions provides for the tailoring of vehicle acceleration.

Figure 5:
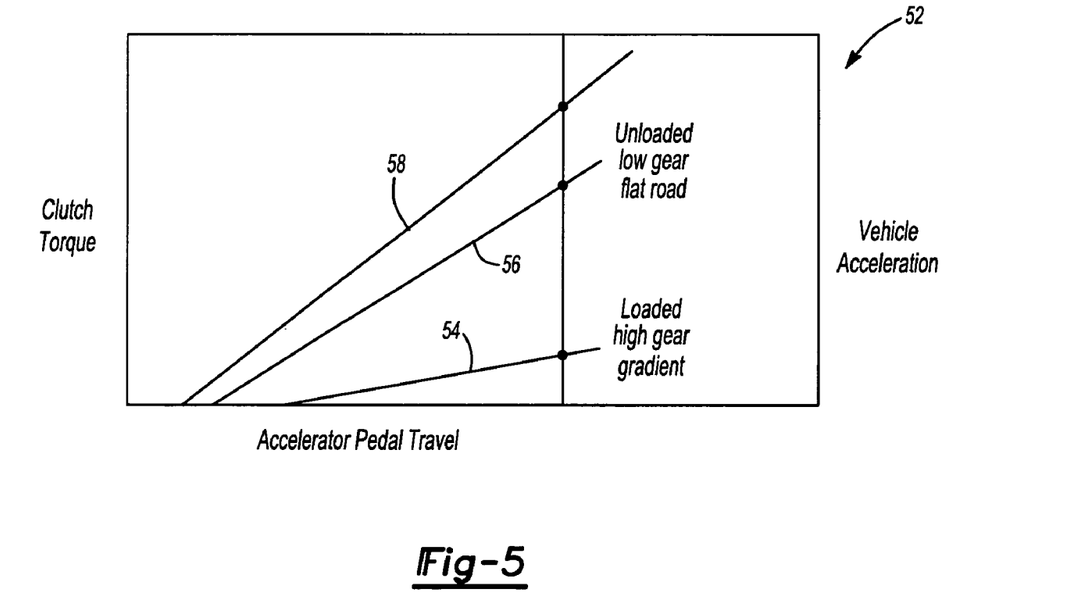
FIG. 5 is a graph illustrating the relationship between accelerator pedal travel and torque for differently configured vehicles.

Referring to FIG. 5, graph 52 illustrates the typical prior art relationship between accelerator pedal travel and clutch torque. Clutch torque is the amount of torque transferred from an engine 15 (FIG. 8) to the output shaft 14. Line 58 represents the fixed relationship between clutch torque and accelerator pedal movement.

Vehicle acceleration is dependent on current vehicle conditions, such as vehicle load, and the type of road surface, for example. A heavily loaded vehicle on a steep grade moves off at a much slower rate of acceleration, as shown at 54, than a lightly loaded vehicle on a flat road as shown by line 56 for the same amount of clutch torque and accelerator pedal travel.

Figure 6:
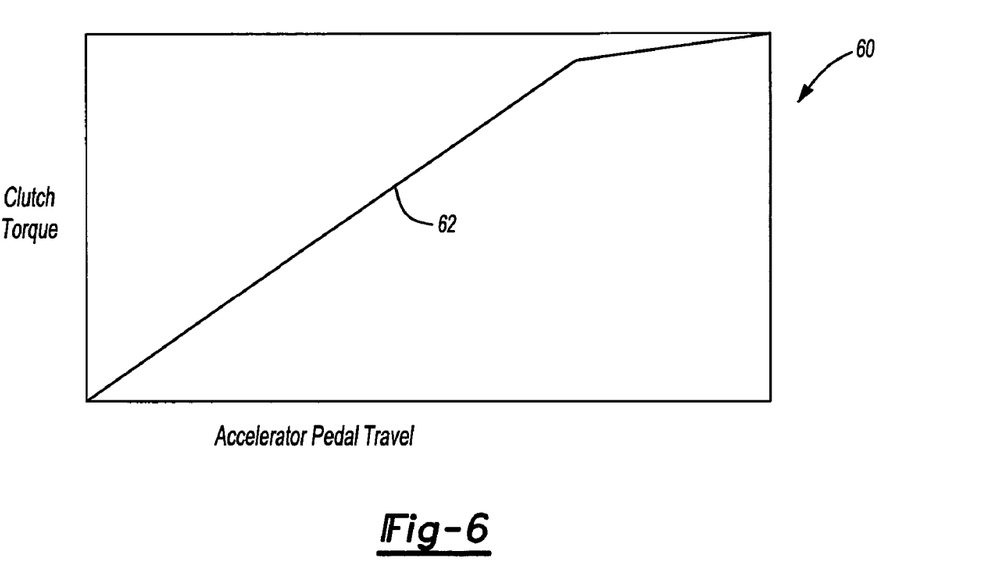
FIG. 6 is a graph illustrating a relationship between accelerator pedal travel and engine speed.

Referring to FIG. 6, graph 60 illustrates the relationship between engine speed and accelerator pedal travel at a constant substantially linear relationship 62 for a vehicle equipped with a typical prior art automated centrifugal clutch assembly. The linear relationship produces the vehicle acceleration illustrated by lines 54 and 56 in FIG. 5 depending on current vehicle operating conditions.

Figure 7:
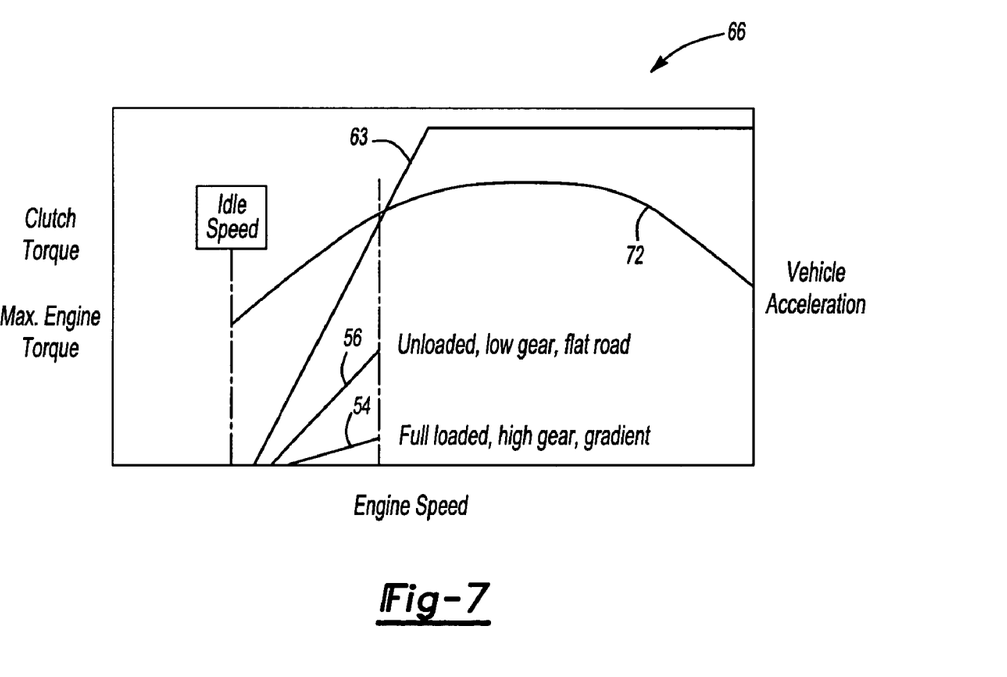
FIG. 7 is a graph illustrating the relationship between engine torque, clutch torque and engine speed for differently configured vehicles.

Referring to FIG. 7, graph 66 illustrates the relationship between clutch torque, engine speed and vehicle acceleration for a lightly and heavily loaded vehicle. The line 63 represents maximum available engine torque relating to engine speed. The line 72 illustrates the relationship between clutch torque and engine speed. The lines 56 and 54 illustrate the different rates of vehicle acceleration at a given engine speed for different vehicle operating conditions similar to that of FIG. 5. The same amount of clutch torque 63 provides different vehicle acceleration depending on vehicle conditions. Therefore, adjusting clutch torque provides an adjustment that can tailor vehicle acceleration.

Figure 8:
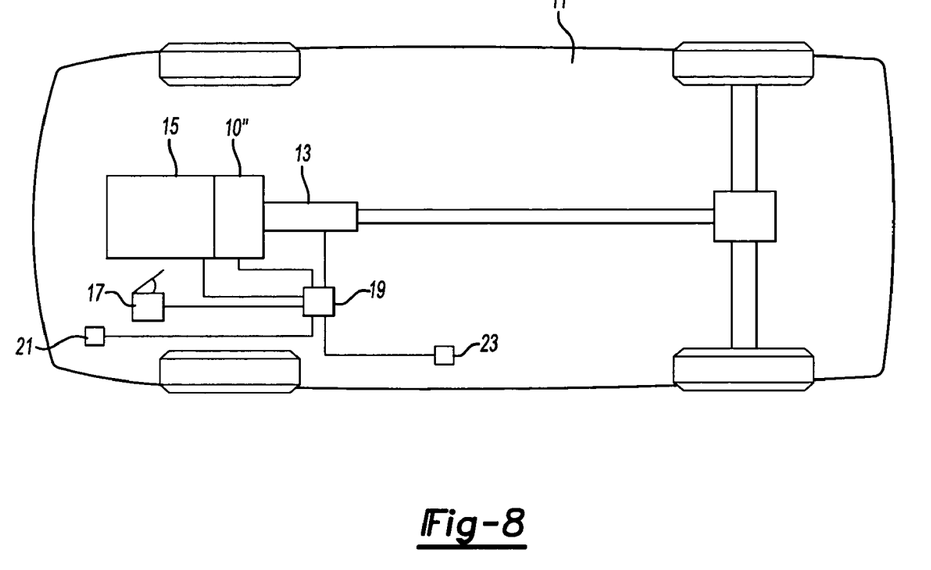
FIG. 8 is a schematic illustration of a motor vehicle according to this invention.

Referring to FIG. 8, a schematic diagram of a vehicle 11 includes an accelerator pedal 17 operated by a vehicle operator to control engine speed. A controller 19 controls the engine 15 and automated clutch assembly 10". The controller 19 adapts engine speed and clutch torque transfer characteristics to accelerator pedal travel such that vehicle acceleration is consistent regardless of vehicle operating conditions. The operating conditions are measured by sensors 21 and 23. The sensors 21 and 23 can measure any known vehicle performance parameter for use in determining a proper clutch torque.

Figure 9:
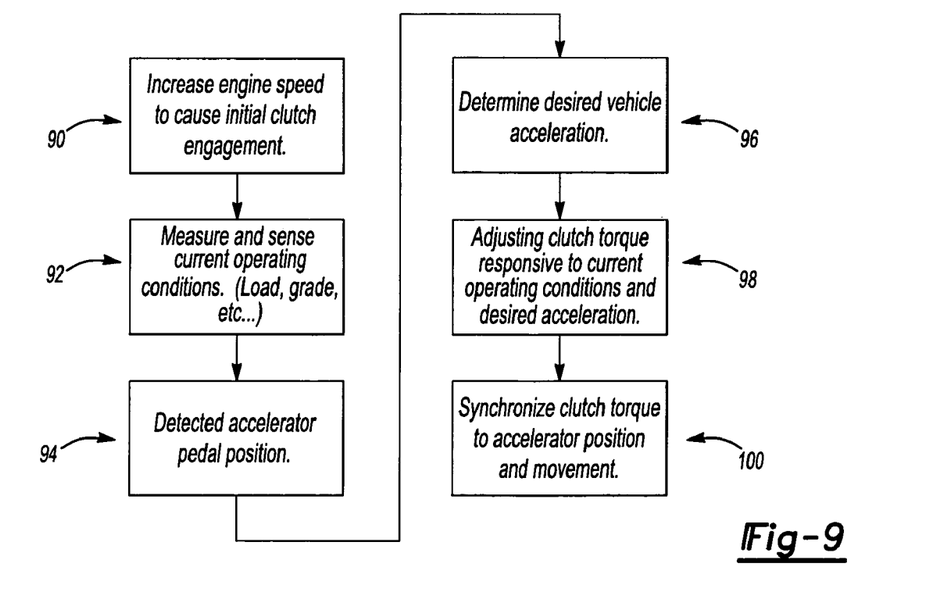
FIG. 9 is a flow diagram illustrating the method steps for adjusting clutch actuation to provide desired vehicle acceleration.

Referring to FIG. 9, a flow diagram illustrates the method steps of this invention. During operation of the clutch assembly 10" according to this method, the controller 19 (FIG. 8) communicates with the engine 15 and clutch assembly 10" to initially provide unrestrained engine acceleration to quickly begin clutch engagement and begin moving the vehicle 11, as is indicated at 90. The necessary torque and engine speed for initially moving the vehicle 11 is determined considering current vehicle operating characteristics. Vehicle operating characteristics can include weight, drive off gear ratio, and drive off gradient. Sensors disposed throughout the vehicle provide information to the controller 19 regarding current vehicle conditions 92. A worker with the benefit of this disclosure would understand that many different methods and configuration of sensors can be used in conjunction with this invention.

The position of the accelerator pedal is measured 94 and desired vehicle acceleration is determined based on accelerator pedal position 96. Actuation of the accelerator pedal 17 is used to provide an indication of desired vehicle acceleration. For example, quick movement would indicate a desired quick acceleration, whereas slower movement would indicate slower desired vehicle acceleration. The clutch torque is controlled such that like positions of the accelerator pedal produces the desired amount of vehicle acceleration regardless of the load on the vehicle. The controller 19 adjusts the amount of torque transferred 98 through the clutch assembly 10" by controlling clutch actuation, the engine speed, or a combination of both engine speed and clutch actuation.

Once the vehicle 11 begins initial movement, a relationship between clutch torque and accelerator pedal travel for the current sensed operating conditions is determined such that the vehicle 11 accelerates at a desired rate of acceleration. The relationship provides a synchronization between accelerator pedal travel and vehicle acceleration 98. Tailoring clutch torque to accelerator pedal position provides for a consistent feel for an operator, and eliminates the need for the operator to adapt to differing conditions. The torque output is tailored to vehicle operating conditions, such that the same accelerator pedal position provides substantially identical vehicle acceleration regardless of changes in vehicle operating conditions.

The amount of clutch torque transferred from the engine 15 to the output shaft 14 is adjusted by controlling actuation of the clutch assembly 10" or by controlling engine speed. The controller 19 can control axial movement of the front plate 26 to provide the desired amount of torque transfer. Further, the controller 19 can adjust engine speed and clutch actuation in concert to provide the desired torque transfer to the output shaft 14.

Although preferably vehicle acceleration is kept substantially constant, adjustment of other performance parameters are within the contemplation of this invention. The controller 19 commands the engine 15 and clutch assembly 10" to provide the required engine speed and clutch torque transfer required to implement and provide the desired drive off acceleration. Additional movement of the accelerator pedal 17 causes a proportional change in engine speed and clutch actuation according to predetermined vehicle operating characteristics for further operation of the vehicle 11.

Figure 10:
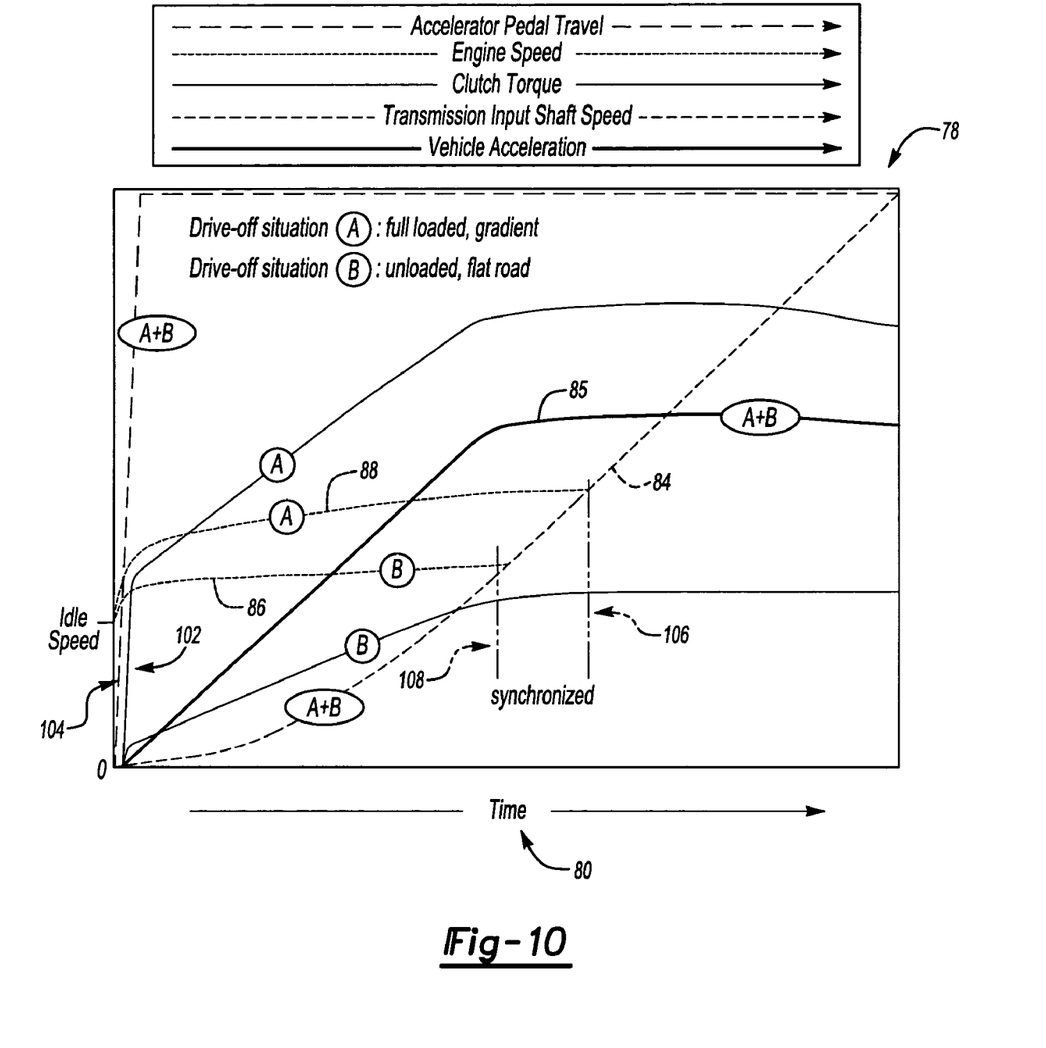
FIG. 10 is a graph illustrating adaptation of accelerator pedal travel and engine speed to provide common vehicle acceleration for different vehicle conditions.

Referring to FIG. 10, graph 78 illustrates vehicle acceleration and the relationship between engine speed and clutch torque for differently loaded vehicles. The vehicle acceleration line 84 is the same for both the fully loaded and unloaded vehicles, because clutch torque has been adjusted for each condition as is shown by the dashed lines 88, 86. Note that for the fully loaded vehicle, clutch torque 88 is higher than that of the unloaded vehicle, because the fully loaded vehicle requires more torque to obtain the same vehicle acceleration.

Points 102 and 104 illustrate differing engagement points of the clutch 10 for each of the vehicle conditions. Engine speed 85 is held constant in this illustration and the clutch torque 88, 86 is adjusted according to the sensed vehicle conditions to provide the desired vehicle acceleration 84. As appreciated, the engine speed 85 can also be adjusted to provide the desired amount of torque transfer.

For a heavily loaded vehicle in high gear and on a steep grade, engagement of the clutch is not initiated until the engine speed is at a level that provides the desired torque as shown at point 102. Clutch engagement is therefore delayed relative to engagement point 104 for the lightly loaded vehicle. As the engine speed climbs and torque transfer is adjusted, the position of the accelerator pedal is synchronized as is shown at points 108 and 106 to tailor torque transfer through the clutch to provide the desired vehicle acceleration.

Accordingly, the clutch assembly of this invention provides for improved operation by varying torque transfer with rotational speed in a non-linear manner to facilitate gear changes and other operating requirements. Further, the method of accelerator pedal adaptation provides for common operator inputs to produce common vehicle outputs regardless of current vehicle operating conditions. The benefits provided by these inventions improve drivability of a vehicle equipped with an automated centrifugal clutch assembly.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An automatic clutch assembly comprising:
a plurality of centrifugal weights movable radially in response to rotation; and
a reaction surface cooperating with said plurality of centrifugal weights causing clutch actuation according to a non-linear relationship between torque transfer and rotational speed, wherein said reaction surface comprises a plate movable axially responsive to radial movement of said plurality of centrifugal weights that moves axially toward an engaged position at a first rotational speed, and axially toward a release position at a second rotational speed greater than said first rotational speed.

2. The assembly as recited in claim 1, wherein said plate includes at least one engagement surface causing axial movement toward said engaged position, and at least one disengagement surface causing axial movement away from said engaged position.

3. The assembly as recited in claim 2, wherein said at least one disengagement surface comprises a plurality of disengagement surfaces wherein said at least one engagement surface comprises a plurality of said engagement surfaces.

4. The assembly as recited in claim 2, wherein said plurality of centrifugal weights moves onto said disengagement surface at a rotational speed corresponding with a desired gear change.

5. The assembly as recited in claim 2, wherein said reaction surface provides for adjustment of torque transfer between a plurality of friction plates and a corresponding plurality of pressure plates.

6. An automatic clutch assembly comprising:
a plurality of centrifugal weights movable radially in response to rotation;
a pressure plate movable axially responsive to radial movement of said plurality of centrifugal weights; and
a reaction surface including at least one engagement surface causing an increase in torque transfer and at least one disengagement surface causing a reduction in torque transfer, wherein said at least one disengagement surface is radially outboard of said at least one engagement surface.

7. The assembly as recited in claim 6, including a static surface between said at least one engagement surface and said at least one disengagement surface, wherein said static surface maintains a uniform torque transfer responsive to radial movement of said plurality of centrifugal weights.

8. The assembly as recited in claim 7, wherein said at least one engagement surfaces comprises two engagement surfaces separated radially by one of said static surface and one of said at least one disengagement surfaces.

9. The assembly as recited in claim 6, wherein said reaction surface is fixed relative to axial movement of said pressure plate.

10. The assembly as recited in claim 6, wherein said reaction surface comprises a surface of said pressure plate engaged with said plurality of centrifugal weights.

* * * * *

UNITED STATES PATENT AND TRADEMARK OFFICE
CERTIFICATE OF CORRECTION

| | |
|---|---|
| PATENT NO. | : 7,318,513 B2 |
| APPLICATION NO. | : 11/058877 |
| DATED | : January 15, 2008 |
| INVENTOR(S) | : AbuSamra et al. |

It is certified that error appears in the above-identified patent and that said Letters Patent is hereby corrected as shown below:

ON THE TITLE PAGE ITEM [75]

Inventor Loren Christopher Dreier's should read as: --Loren Christopher Dreier, Southern Pines, NC (US)--

Signed and Sealed this

Twentieth Day of May, 2008

JON W. DUDAS
*Director of the United States Patent and Trademark Office*